Oct. 27, 1953  J. C. RUMSEY  2,656,866
NUTCRACKER
Filed Feb. 20, 1950

INVENTOR.
John C. Rumsey
BY
ATTORNEY.

Patented Oct. 27, 1953

2,656,866

UNITED STATES PATENT OFFICE 2,656,866

NUTCRACKER

John C. Rumsey, Topeka, Kans., assignor of one-half to Ferne R. Vanderhoof, Lawrence, Kans.

Application February 20, 1950, Serial No. 145,281

1 Claim. (Cl. 146—15)

This invention relates to hand-operated nut crackers which are capable of being used to break the shell of nuts in preparation for the removal of the nut meats therefrom.

The most important object of this invention is to provide a nut cracker having a compartment for holding the nut during the cracking process and for retaining the nutmeats and shell fragments after the breaking operation, thus preventing the scattering of the fragmentary material when the shell shatters.

Another important object is to provide a nut cracker which will hold the nut during the cracking operation without the necessity for using the fingers where the cracking or crushing is taking place, thus eliminating the danger of injury to the hands as often results with the use of conventional nut crackers.

A still further object is to provide a nut cracker which is in the nature of a standard household article that can be manufactured easily and cheaply, and can be made available on the market at a reasonable cost.

Figure 1:
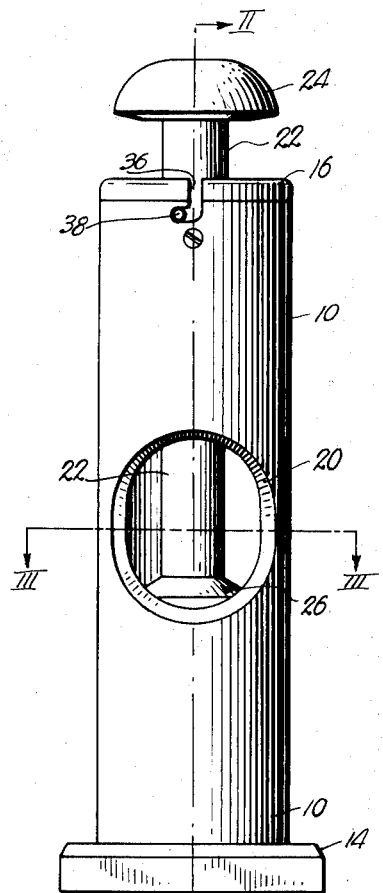
Figure 1 is a front elevational view of the nut cracker.

Various means have heretofore been provided for use in cracking nuts, but none have the feature of this invention for safety, ease of manufacture and retention of all of the material after the nut has been cracked. As an example, it is well known that many times injuries occur to the hand holding the nut in the pincer-type nut cracker. Also, at the instant of cracking, the shell usually shatters and flies in all directions with some of the nut meats, thus creating an unclean and undesirable condition. In the invention shown in this application, the above-mentioned ill-effects have been eliminated by cracking the nut in a close chamber, thus preventing injury to the hands and retaining all of the shell and nut meats where they may be dispensed and separated at will.

In the drawing, there is illustrated a nut cracker which includes an elongated, tubular body 10 closed at one end 12 which serves as an anvil during operation and a supporting base 14 affixed to body 10 adjacent to end 12 for maintaining the nut cracker in an upright position when not in use. A plug 16 closes the upper end of body 10 and has a bore 18 therethrough in substantial alignment with the longitudinal center line of body 10. An opening 20 is formed in the side of body 10 intermediate the ends thereof for access to the interior of body 10.

An elongated shaft 22 extends into body 10 through bore 18 and has a circular rounded cap 24 affixed to the external end thereof to furnish a broad surface without sharp edges for the hand to strike, thus reducing discomfort to a minimum when the device is being operated. Shaft 22 has a head 26 in opposed relationship to cap 24, head 26 having a diameter less than the internal diameter of body 10 to allow free sliding movement as the shaft 22 is shifted. Head 26 serves further to maintain shaft 22 in alignment and located centrally in body 10 as shaft 22 is shifted.

Head 26 has a frusto-conical end 28 with a plurality of concentric grooves 30 formed at the center of end 28 which engage the surface of the nut during the cracking process. A spring 34 in body 10 interconnects head 26 and plug 16 to yieldably hold shaft 22 at the uppermost end of its path of travel. An L-shaped slot 36 in plug 16 and body 10, registering with bore 18, receives a laterally-extending pin 38 on shaft 22 to releasably hold head 26 at the innermost end of its path of travel when not in use.

Figure 2:
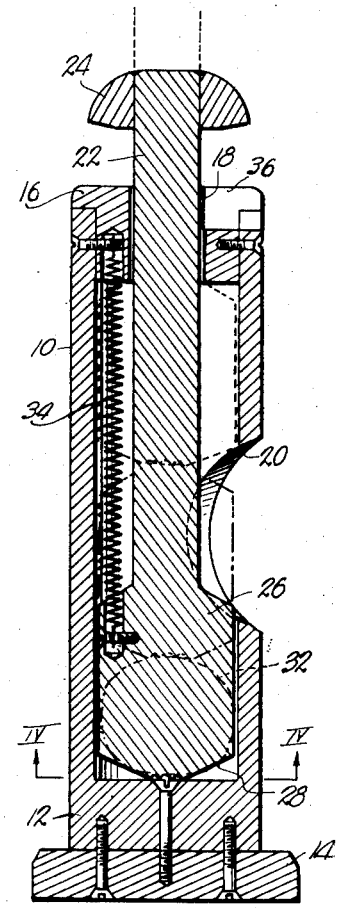
Fig. 2 is a cross-sectional view taken along line II—II of Figure 1 showing the hammer element in three positions by use of broken lines.
Figure 3:
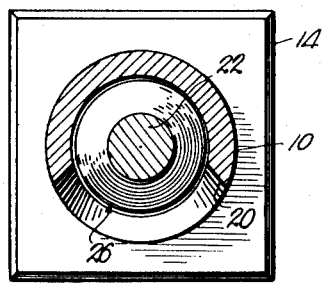
Fig. 3 is a cross-sectional view taken on line III—III of Fig. 1.
Figure 4:
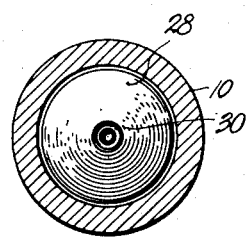
Fig. 4 is a cross-sectional view taken on line IV—IV in Fig. 2, looking in the direction of the arrows.

In operation, pin 38 is released from slot 36 by rotating shaft 22 slightly, and head 26 is permitted to rise to the dash-line position shown in Fig. 2 above opening 20 by the action of spring 34, whereupon a nut 32 may be inserted through opening 20 and lodged in place within body 10 and against end 12.

With the nut 32 in place, head 26 is moved into the dot-dash line position shown in Fig. 2, thus bringing the grooves 30 into engagement with the nut 32. Cap 24 is thereupon forcibly pushed or struck a blow which is transmitted to the shell of nut 32 through shaft 22, thus breaking the shell and releasing the nut meats.

After the shell is broken, head 26 is again permitted to rise above the opening 20 and the broken shell and nut meats may be poured from the interior of body 10 and separated. If shaft 22 is moved downwardly without a nut being present in body 10, head 26 will travel downwardly until grooves 30 engage the end 12 of body 10 as appears in the full-line position in Fig. 2.

This is the normal at-rest position of the hammer element when the nut cracker is not in use.

The grooves 30 perform the important function of biting into and holding nut 32 during the cracking process. Without the restraining effect of grooves 30, smaller nuts 32 would be free to slide toward the side wall of body 10 and become wedged thereagainst, thus increasing the amount of effort required to operate the hammer element. Grooves 30 operate to hold the nut centrally located and to render certain that a direct blow on the nut will result when cap 24 is struck, thus increasing the efficiency of the unit.

From the foregoing, it will be seen that a nut cracker has been provided which is extremely simple, having few parts and may be constructed from a wide range of materials. Many changes and modifications may be made in the structure herein disclosed and described, and those that fairly come within the scope of the appended claim are contemplated hereby.

Having thus described the invention, what is claimed as new and desired to be secured by Letters Patent is:

A nut cracker comprising an elongated, cylindrical body having a base, a closed, lowermost end wall, and a single nut-receiving opening intermediate the ends thereof spaced above said end wall; a plug in the body at the uppermost end thereof and provided with a bore in axial alignment with the body; an elongated, rotatable shaft slidably mounted for vertical reciprocation in said bore; a hand-engaging, dome-shaped cap on the uppermost end of said shaft; a head on the lowermost end of the shaft within said body, said head having a substantially dome-shaped, frusto-conical, lowermost face provided with a plurality of concentric, annular grooves at the apex thereof; a coil spring in the body alongside the shaft interconnecting the head and the plug for yieldably biasing the head toward the plug; and a laterally extending, horizontal pin on the shaft, there being an L-shaped slot in the plug and body for receiving the pin to lock the shaft, the cap and the head at the lowermost end of their reciprocable paths of travel with the head engaging said lowermost end wall of the body and with said spring tensioned, said nut-receiving opening being above the head when the latter engages said end wall and beneath the head when the latter is at the uppermost end of its path of travel.

JOHN C. RUMSEY.

References Cited in the file of this patent

UNITED STATES PATENTS

| Number | Name | Date |
|---|---|---|
| 1,044,448 | Flis | Nov. 12, 1912 |
| 1,255,808 | Spencer | Feb. 5, 1918 |
| 1,412,249 | McClung | Apr. 11, 1922 |
| 2,377,369 | Potter | June 5, 1945 |

FOREIGN PATENTS

| Number | Country | Date |
|---|---|---|
| 648,488 | Germany | Aug. 2, 1937 |